United States Patent [19]

Fimeri

[11] Patent Number: 5,678,945
[45] Date of Patent: Oct. 21, 1997

[54] DETENT MECHANISM

[75] Inventor: Garry Gordon Leslie Fimeri, Morphett Vale, Australia

[73] Assignee: Britax Rainsfords Pty Ltd., Lonsdale, Australia

[21] Appl. No.: 558,267

[22] Filed: Nov. 13, 1995

[30] Foreign Application Priority Data

Nov. 14, 1994 [AU] Australia ............... PM9423

[51] Int. Cl.$^6$ ............................................. F16C 11/10
[52] U.S. Cl. .................... 403/92; 403/16; 403/103; 248/478; 248/900
[58] Field of Search ................... 403/83, 84, 86, 403/87, 91–94, 96, 98, 103, 16, DIG. 8; 248/900, 477, 478; 359/841, 872

[56] References Cited

U.S. PATENT DOCUMENTS

| | | | |
|---|---|---|---|
| 2,944,343 | 7/1960 | Anthony | 33/501.19 |
| 3,295,568 | 1/1967 | Cassey | 403/84 X |
| 4,070,058 | 1/1978 | Muehling | 403/92 X |
| 4,789,232 | 12/1988 | Urbanek | 248/900 X |
| 5,005,797 | 4/1991 | Maekawa et al. | 248/900 X |
| 5,226,342 | 7/1993 | Panin | 74/575 |
| 5,375,014 | 12/1994 | Fujie et al. | 359/841 |
| 5,384,660 | 1/1995 | Oishi | 248/478 X |
| 5,432,640 | 7/1995 | Gilbert et al. | 248/478 X |
| 5,477,392 | 12/1995 | Mochizuki et al. | 248/478 X |
| 5,523,894 | 6/1996 | Koiwai | 248/477 X |

FOREIGN PATENT DOCUMENTS

| | | | |
|---|---|---|---|
| 139 509 | 5/1985 | European Pat. Off. | |
| WO92/12352 | 7/1992 | European Pat. Off. | |
| 551607 | 7/1993 | European Pat. Off. | 245/478 |

OTHER PUBLICATIONS

Hasui Masayasu, Rotary Mechanism of Door Mirror, Mar. 9, 1989, Abstract, vol. 13, No. 258 (M–838), Jun. 15, 1989 & JP-A-01 063434 1 page.

*Primary Examiner*—Harry C. Kim
*Attorney, Agent, or Firm*—Davis and Bujold

[57] ABSTRACT

A detent mechanism that acts between two components that rotate with respect to one another to control rotation from a first set position to at least a second set position. The detent mechanism (10) comprises at least one rotating cam (23) positioned between adjacent surfaces of two components (11 and 16). The cam (23) is spaced from the axis of rotation of the two components (11 and 16). The cam (23) is journalled for rotation on one of the components (11) about an axis that is substantially transverse to the axis of rotation between the two components (11 and 16). The operating surface (25) of the cam (23) comprises at least one cam lobe that is caused to rotate as the two components (11 and 16) rotate. The cam (23) acts to separate the two components (11 and 16). Spring (17) acts to urge the adjacent surfaces together so that a predetermined torque is required to cause relative rotation between the components (11 and 16). The torque is set by the force applied by the spring (17) that results from the extent of compression of the spring (17) when the two components (11 and 16) separate upon rotation. The advantage of the detent mechanism (10) is that sufficient resistance to rotation can be obtained with a relatively light spring (17) due to the high rate of lift provided by the cam (23).

20 Claims, 3 Drawing Sheets

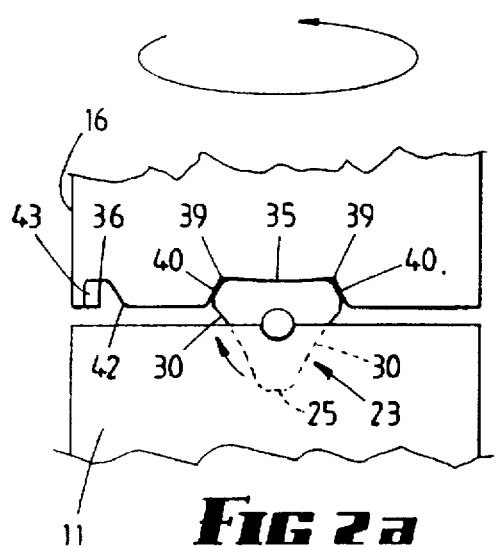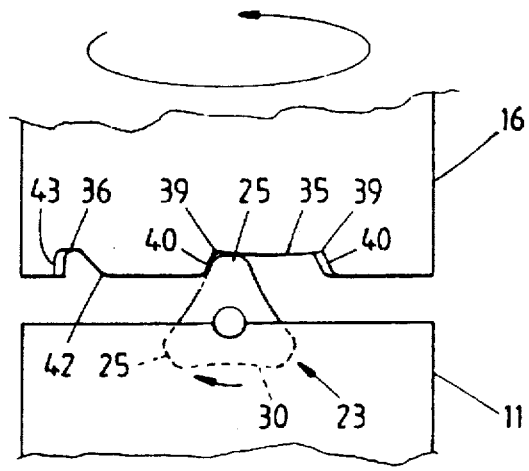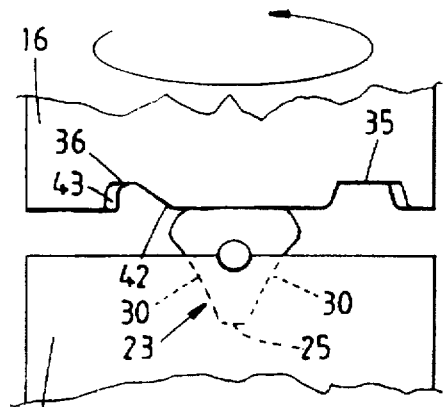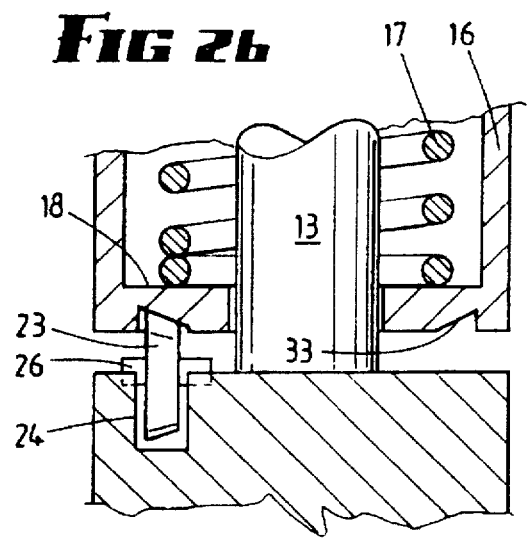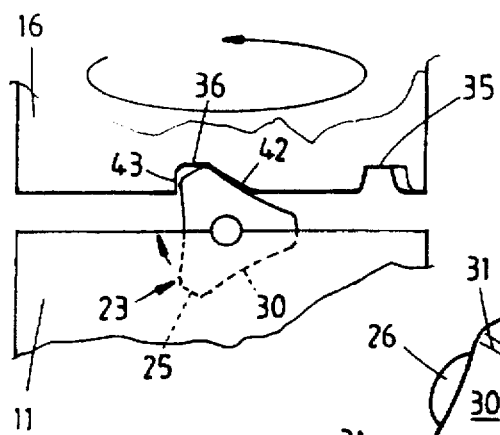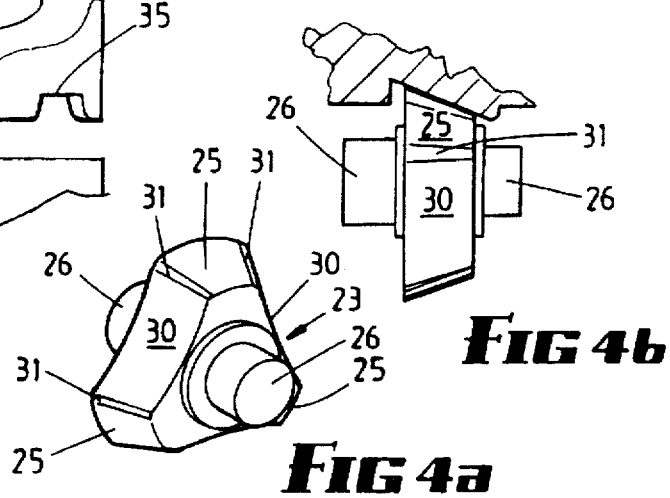

DETENT MECHANISM

FIELD OF THE INVENTION

This invention relates to a detent mechanism, and in particular to a detent mechanism that can be used on two components that rotate with respect to one another.

BACKGROUND OF THE INVENTION

The invention will find many applications, however for ease of description, the invention will be described in respect of its application on automotive rear vision mirrors. It is common to ensure that a rear vision mirror can rotate about a vertical axis. This is to enable break-away of the mirror from its 'in use' position upon impact, or for the purposes of positioning the mirror closer to the body of the motor vehicle. The mirror body is journalled for rotation about a vertical axis to a mounting member, and the mounting member is secured to the external bodywork of the motor vehicle.

In the past, use has been made of detent balls and associated springs. The balls sit in recesses, and there is a minor amount of elevation upon rotation of the components. It is difficult to provide an initially high break-away force or pre-determined torque without the use of high load springs acting on the detent balls and metallic detent faces.

In addition, such configurations are expensive and complex, and use can not be made of polymeric moulded components which would be cheaper and easier to manufacture.

OBJECTS AND SUMMARY OF THE INVENTION

Therefore, it is an object of this invention to overcome the abovementioned problems, and in particular to provide a novel detent mechanism which can be easily and cheaply manufactured.

In its broadest form, the invention is a detent mechanism that acts between two components that rotate with respect to one another to control rotation from a first set position to at least a second set position that comprises:

at least one rotating cam positioned between adjacent surfaces of said two components and spaced from the axis of rotation of said two components, said cam being journalled for rotation on one of said components about an axis that is substantially transverse to the axis of rotation between said two components, the operating surface of said cam comprising at least one cam lobe that is caused to rotate as said two components rotate and acts to separate said components, and resilient means acting between said two components to urge said adjacent surfaces together and one of said adjacent surfaces against said cam so that a predetermined torque is required to cause relative rotation between said components, said predetermined torque being set by the force applied by said resilient means resulting from the extent of compression of said resilient means when said two components separate upon rotation.

Preferably, the cam or cams may be symmetrically shaped, for example having three or four lobes so that it is either triangular or square in plan. It is obviously arranged such that in the first position, the surface that engages one of the members has a minimum distance between the surface and the axis of rotation of the cam. Upon relative rotation between the two components, the cam is caused to rotate and the upward path of a lobe causes the two components to be separated as the lobe is brought between the adjacent component and the axis of rotation of the cam.

With this particular arrangement, moulded polymeric components may be used, and the use of such materials is aided by the fact that the spring means located between the members can be relatively light. The use of a cam as a detent enables a higher lift or greater separation to be achieved for a relatively small amount of relative rotation between the components. This large lift obviously results in greater deflection of the spring means which in turn will result in a greater force being applied. As such, the force required to initiate movement can be more easily controlled; the required force being obtained by a lighter spring and simplified construction by comparison to existing detent mechanisms. Accordingly, the detent mechanism will provide a high initial break-away torque that is desirable through the use of a lighter spring.

In fact, in order to achieve the same degree of lift and predetermined torque achieved by the invention, a detent ball would need to have a disproportionately large diameter. This is clearly unacceptable.

In order for the invention to be fully understood, preferred embodiments will now be described, however it should be realised that the scope of the invention is not to be confined or restricted to the exact details of the embodiments.

The embodiments are illustrated in the accompanying figures in which:

BRIEF DESCRIPTION OF THE DRAWINGS

FIGS. 2a to 2d show schematic side views of the cam's operation, from a start position (FIG. 2a), to a position where the frame is raised (FIG. 2b), to a position where the cam is between stop recesses (FIG. 2c), and to a position where the cam is located within a stop recess (FIG. 2d), FIG. 3 shows a part cross-section view of a base portion, cylindrical housing, spigot and cam, FIGS. 4a and 4b show a perspective and side view of the cam.

DETAILED DESCRIPTION OF THE PREFERRED EMBODIMENTS

Figure 1:
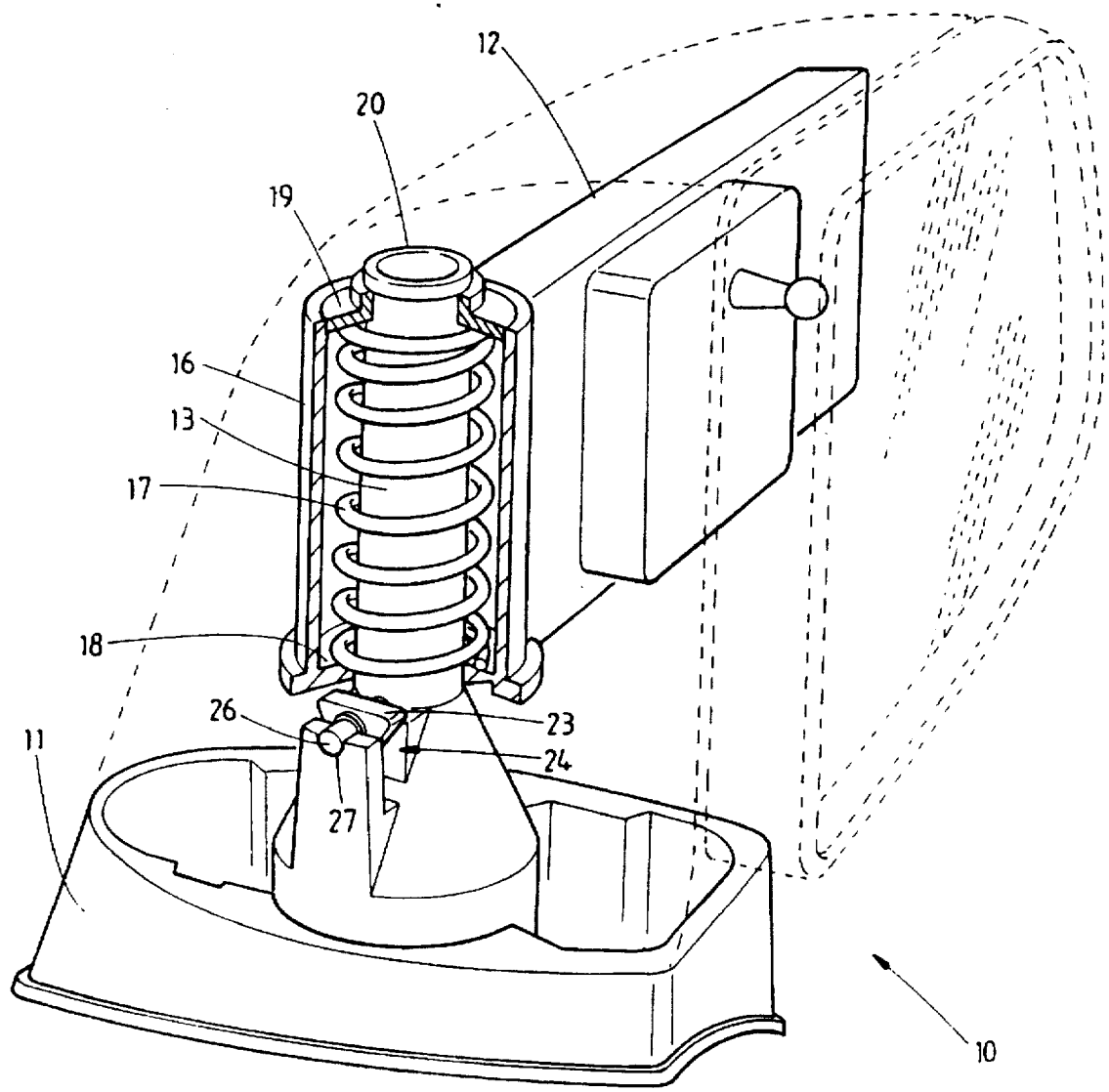
FIG. 1 shows a part perspective view of a mirror mounting member and mirror body support frame.

As seen in FIG. 1, the invention in this embodiment is illustrated in respect of its application to an automotive mirror spigot mounting 10. The spigot mounting 10 comprises a base portion 11 of a mounting member and a frame 12 to which a mirror body is mounted. The frame 12 is pivotally attached to the base 11 via a spigot 13. The spigot 13 is secured to the base 11.

The frame 12 has a cylindrical housing 16 which locates over the spigot. A spring means, which in this embodiment comprises a helical spring 17, is located over the spigot 13, and is held within the cylindrical housing 16. The cylindrical housing 16 has a flange 18 against which the lower end of the spring 17 abuts. A spring retainer 19 locates at the upper end of the spigot 13 and bears against a circlip 20 which is located on the upper end of the spigot 13. The spring 17 bears against the spring retainer 19, and the spring 17 is pre-compressed and thereby forces the frame 12 against the base 11. The cylindrical housing 16 is free to rotate with respect to the spring retainer 19.

A cam 23 is located within a recess 24 formed in the base of the spigot 13. As shown in FIG. 4a, the cam 23 is generally triangular in shape, the points of the triangular surface comprising the cam surfaces 25. The cam has a shaft 26 which is located in bearings 27 that are formed in the base 11.

In this embodiment, the cam 23 is formed so that the cam surfaces 25 are curved, the centre of curvature being coincident with the axis of rotation of the cam 23, the cam surfaces 25 further being at an angle with respect to the rotational axis of the cam 23. Accordingly, the cam surfaces 25, when rotated, produce a truncated conical surface having an axis coincident with the rotational axis of the cam 23. The cam surfaces 25 have a relatively large surface area which assists in minimising sliding resistance and the stabilising the frame 12. As the cam 23 is located to one side of the spigot 13, an eccentric force is applied to the housing 16. The use of large areas of surface engagement between the cam 23 and housing 16 prevents rocking or tilting of the housing 16. As the cam 23 is required to slide with respect to the housing 16; the larger surface area minimises the pressure between sliding surfaces thereby reducing wear and sliding resistance. The curvature of the cam surfaces 25 facilitates a rolling movement of the cam 23 to minimise relative sliding when the cam surface 24 is engaged which in turn prevents wear.

The intermediate surfaces 30 between the cam surfaces 25 have a concave curvature with respect to the cam lobes 25. In addition, the intermediate surface 30 is at an angle with respect to the rotational axis of the cam 23. Further, the cam surfaces 25 are provided with a pair of indentations 31.

The cylindrical housing 16, which in this embodiment is moulded from polymeric material, is provided with a track 33 that is designed for engagement with the cam 23. As can be seen in FIGS. 2a to 2c and FIGS. 5a to 5c, the track 33 is provided with recesses 35, 36 and 37. Between the recesses 35, 36 and 37, the track 33 has a track surface 38 which is inclined with respect to a horizontal plan, and the angle matches the inclination of cam surfaces 25 with respect to the rotational axis of the cam 23. The geometry of the track surface 38 in the intermediate surfaces 30 of the cam 23 are the same so that the intermediate surface 30 will mate or abut against the track surface 38.

Figure 5C:
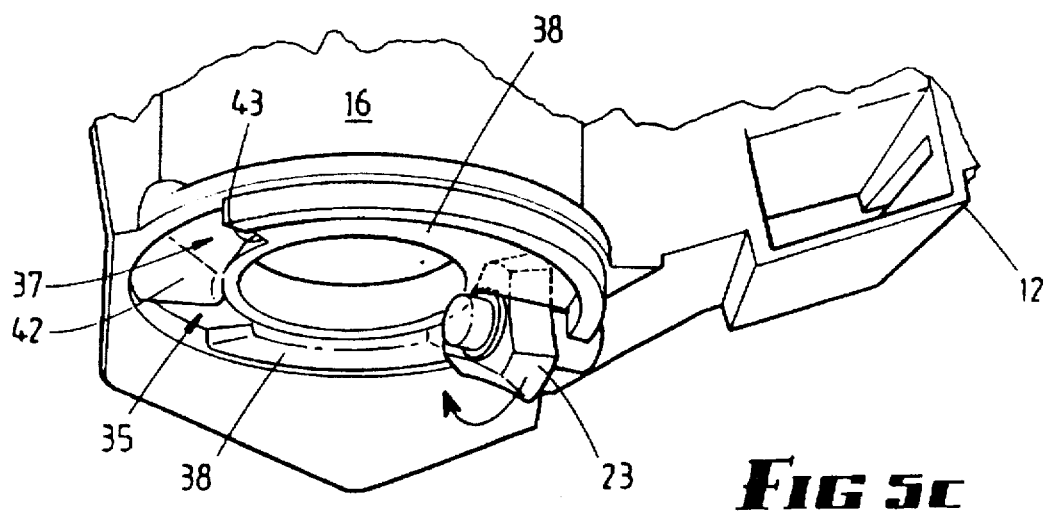
FIGS. 5a to 5c show part perspective views of the cam and cam track. The spigot has been excluded for clarity.
Figure 5B:
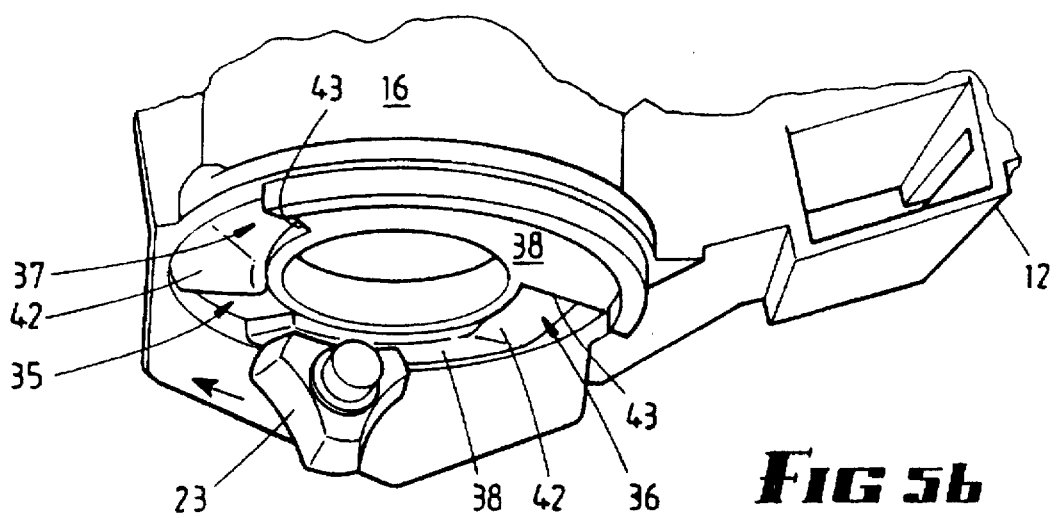
Figure 5A:
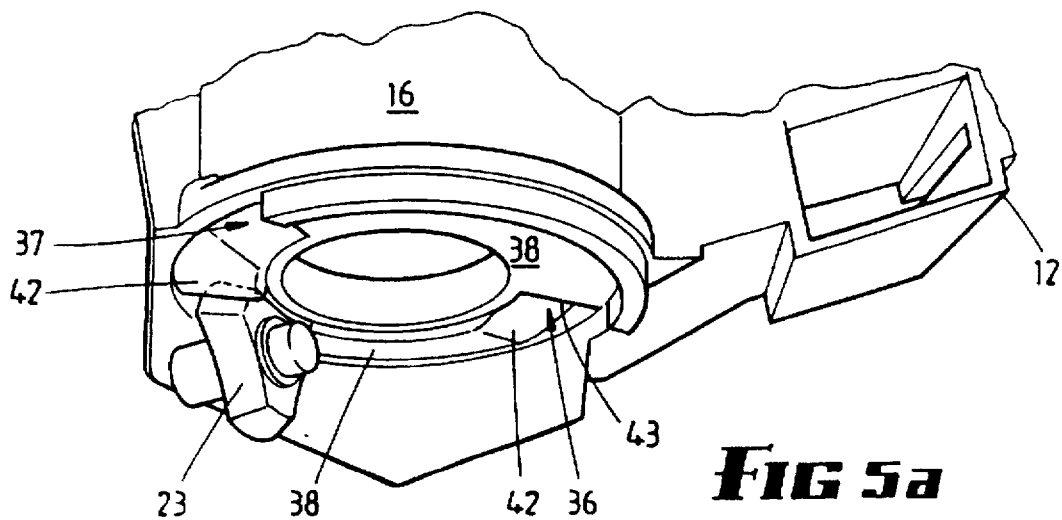

FIGS. 2a to 2c and FIGS. 5a to 5c illustrate the operation of the cam 23. As seen in FIGS. 2a and 5a the cam 23 is initially located within recess 35. With the cam 23 in this position, the base portion 11 and cylindrical housing 16 are position to have minimal clearance between one another. A pair of cam surfaces 25 locate in each corner 39 of the recess 35. There is no clearance between the cam surfaces 25 and the corners 39 so that the frame 12 is held rigidly in this position. The corners 39 have a slight radius, and therefore the cam surface 25 has indentations 31 that rest on the junction between the corner 39 and edge 40. This allows the cam surfaces 25 to abut against the edges 40 of the central recess 35 to ensure that any side loading forces are transferred to the cam 23. This ensures maximum stability while the frame 12 is in its operative position.

As the frame 12 is rotated with respect to the base 11, the cam 23 immediately begins to rotate about shaft 26 so that, as seen in FIG. 2b lobe 25 lifts the cylindrical housing 16 with respect to the base 11. At this point in the rotation of cam 23, the lobe 25 remains within recess 35. Maximum lift and deflection of the spring 17 is therefore achieved with an extremely small amount of rotation of the frame 12. The cam 23 is caused to rotate within the recess 35 due to the leverage created by the cam lobe 25 being acted on by the corner 39 and edge 40 of the recess 35. In addition, the indentations 31 initially minimise the surface contact with the recess 35, and allows some initial sliding of the cam 23 with respect to the recess 35. This allows the cam 23 to achieve the position shown in FIG. 2b.

As rotation of the frame 12 continues, the cam 23 is also caused to rotate until the intermediate surface 30 engages the track surface 38. This continues to provide a clearance as seen in FIG. 2c that will prevent contact between the cylindrical housing 16 and the base 11. As mentioned above, the intermediate surface 30 is shaped so that it is in full surface contact with the track surface 38. Therefore, as the frame 12 continues to rotate, intermediate surface 30 slides over track surface 38.

This rotation continues until the cam locates in either recess 36 or 37. Both recess 36 and 37 are shaped to allow continued sliding of the cam 23 with respect to the track surface 38. The curved surface 42 on both of the recess 36 and 37 are shaped to allow rotation of the cam 23 while at the same time maintaining surface contact with the intermediate surface 30. When one of the cam lobes 25 enters a recess 36 or 37 the abutment of the cam lobe 25 against an edge 43 in either recess 36 or 37 prevents continued rotation of the frame 12, and therefore acts as a stop. The curved surfaces 42 are on the sides of the recesses 36 and 37 that are nearer to recess 35, and the edges 43 are on the sides of the recesses 36 and 37 that are remote from recess 35.

As the intermediate surface 30 remains in contact with the curve surface 42, then the frame 12 can be easily rotated in the opposite direction. The intermediate surface 30 then re-engages track surface 38, and the frame 12 continues to rotate until the cam 23 enters the recess 35. When this occurs, one of the cam lobes 25 enters the recess 35, which in turn causes the cam 23 to rotate about its axis thereby repositioning the cam 23 in the recess 35 as shown in FIGS. 2a and 5a.

As can be seen from FIGS. 5a to 5c, the distance of the recesses 36 and 37 from recess 35 can be varied depending on the extent of rotation of frame 12 that is required.

As will be seen from the above description, the use of the cam 23 provides a very high rate of lift with only small relatively rotation between the frame 12 and the base 11. This in turn increases the extent of compression of spring 17, which means that a lighter spring can be used to obtain the same resistants to initial rotation of the frame 12.

In addition, the invention is ideally suited to manufacturing many of the components from polymeric materials. As such, its manufacture is simple and inexpensive.

CLAIMS DEFINING THE INVENTION ARE AS FOLLOWS:

I claim:

1. A mechanism in combination with two components that rotate with respect to one another about an axis of rotation, in which said mechanism acts as a detent to control rotation of said two components from a first set position to at least a second set position, said mechanism comprises:

at least one rotating cam positioned between adjacent surfaces of said two components and spaced from said axis of rotation between said two components, said cam is journaled for rotation on one of said two components about an axis that is substantially transverse to said axis of rotation between said two components and having an operating surface comprising at least one cam lobe that is caused to rotate as said two components rotate, and the rotation of said cam acting to separate said components, and resilient means acting between said two components to urge one of said adjacent surfaces against said cam so that a predetermined torque is required to cause relative rotation between said two components, and said predetermined torque being set by the force applied by said resilient means resulting from the extent of compression of said resilient means when said two components separate upon rotation.

2. A mechanism according to claim 1 wherein said at least one cam lobe is shaped to first provide a rapid rate of separation of said two components upon commencement of rotation of said two components and then to allow sliding of said one adjacent surface with respect to said cam to allow continued relative rotation of said two components.

3. A mechanism according to claim 2 wherein said cam is generally triangular in shape, and each corner thereof comprises one cam lobe.

4. A mechanism according to claim 3 wherein said cam has at least three or more intermediate surfaces positioned around said axis of said cam, said intermediate surfaces being shaped to engage said one adjacent surface to allow sliding of said intermediate surface with respect to said one adjacent surface.

5. A mechanism according to claim 1 wherein said one adjacent surface urged against said cam has a first recess within which said cam locates, when in said first set position, so that said adjacent surfaces are touching or closely spaced from one another.

6. A mechanism according to claim 5 wherein said at least one cam lobe abuts within a corner of said first recess, thereby forcing rotation of said cam upon commencement of rotation of said two components.

7. A mechanism according to claim 5 wherein said one adjacent surface urged against said cam has a second recess, spaced from said first recess, within which said cam locates to hold said two components in said second set position.

8. A mechanism according to claim 1 wherein said at least one cam lobe is a curved surface that is inclined at an angle with respect to said axis of rotation of said cam.

9. A mechanism according to claim 1 wherein said cam comprises a plurality of lobes that project from said axis of rotation of said cam.

10. A mechanism according to claim 9 wherein said cam comprises three lobes.

11. A mechanism according to claim 1 wherein one of said two components has a recess within which said cam is mounted for rotation.

12. A mechanism according to claim 1 wherein said resilient means is a coil spring.

13. A mechanism according to claim 1 used on a rear vision mirror in which one of said two components comprises a base portion, and the other of said two components comprises a frame to which a mirror body is mounted.

14. A mechanism according to claim 13 further comprising a spigot on said base portion to which said frame is journaled for rotation, wherein said resilient means is a spring acting between said spigot and said frame so that said spring forces said frame toward said base portion, and said cam is mounted for rotation in said base portion.

15. A mechanism according to claim 2 used on a rear vision mirror where one of said two components comprises a base portion, and the other of said two components comprises a frame to which a mirror body is mounted.

16. A mechanism according to claim 3 used on a rear vision mirror where one of said two components comprises a base portion, and the other of said two components comprises a frame to which a mirror body is mounted.

17. A mechanism according to claim 5 used on a rear vision mirror where one of said two components comprises a base portion, and the other of said two components comprises a frame to which a mirror body is mounted.

18. A mechanism according to claim 8 used on a rear vision mirror where one of said two components comprises a base portion, and the other of said two components comprises a frame to which a mirror body is mounted.

19. A mechanism according to claim 11 used on a rear vision mirror where one of said two components comprises a base portion, and the other of said two components comprises a frame to which a mirror body is mounted.

20. A mechanism according to claim 12 used on a rear vision mirror where one of said two components comprises a base portion, and the other of said two components comprises a frame to which a mirror body is mounted.

* * * * *